United States Patent Office 3,336,767
Patented Aug. 22, 1967

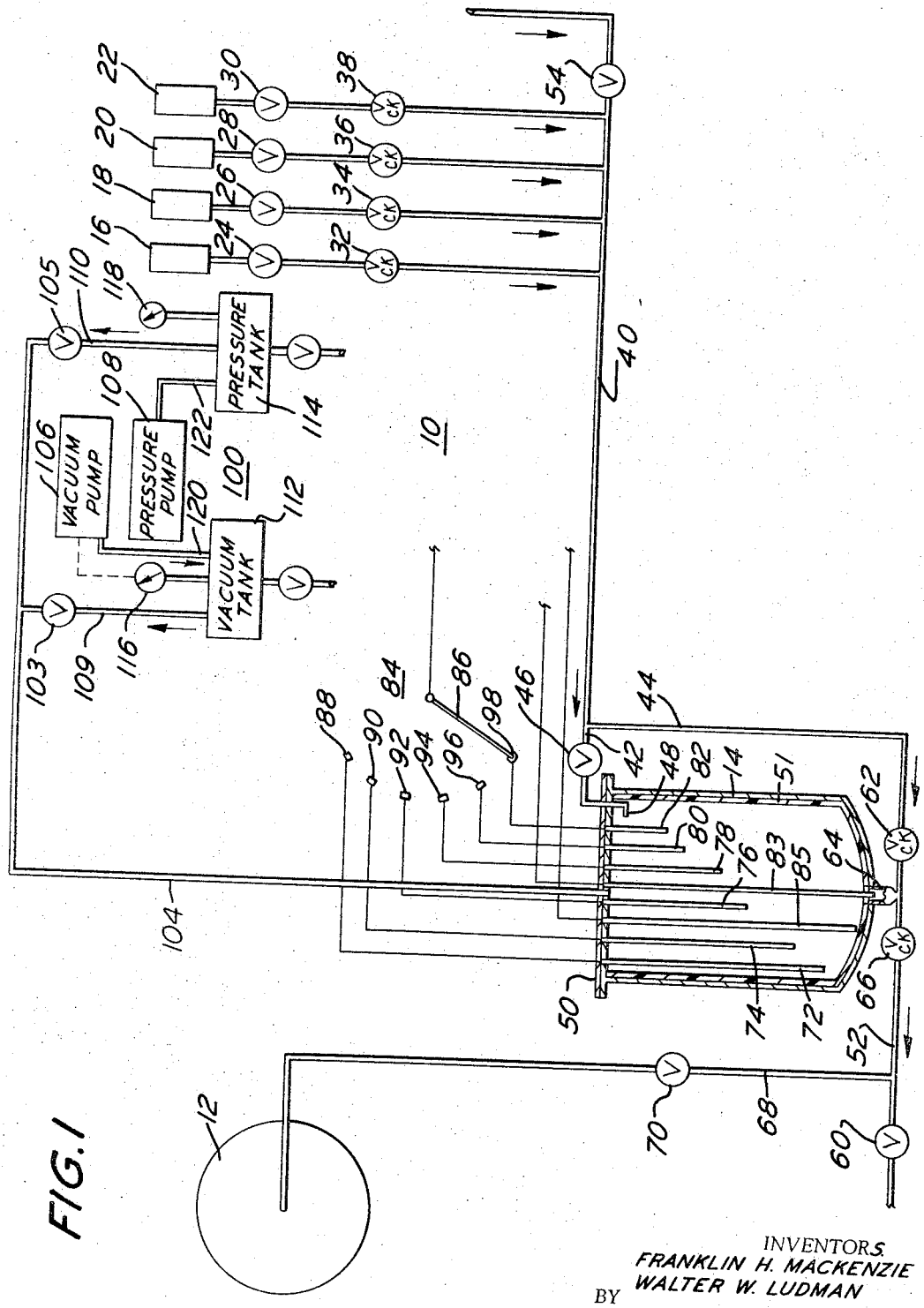

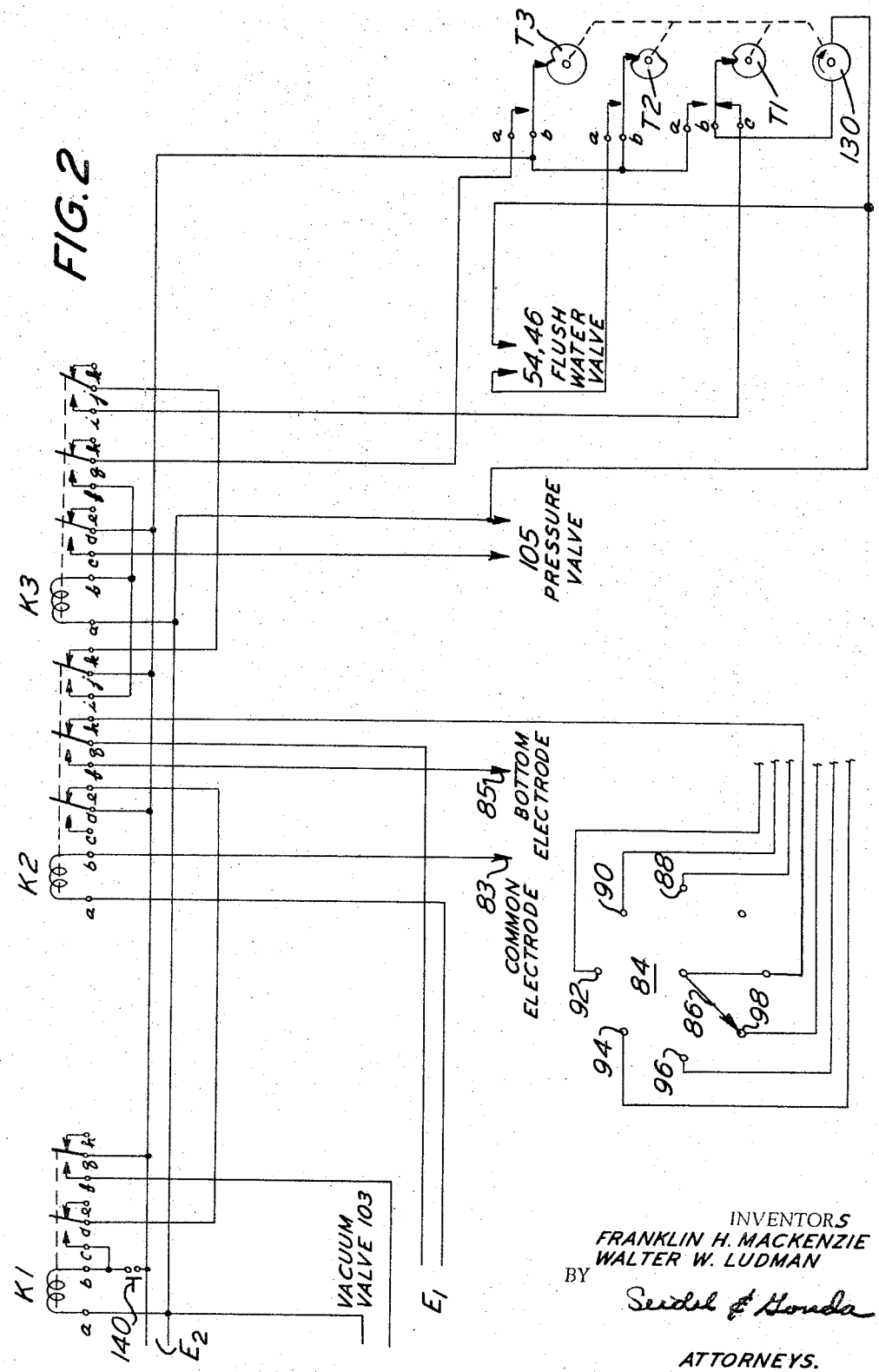

3,336,767
AUTOMATIC CHEMICAL DISPENSING SYSTEM
Franklin H. Mackenzie, Lansdowne, and Walter W. Ludman, Philadelphia, Pa., assignors to AEL Products, Inc., Lansdale, Pa., a corporation of Pennsylvania
Filed Jan. 11, 1966, Ser. No. 520,010
10 Claims. (Cl. 68—12)

ABSTRACT OF THE DISCLOSURE

System for delivering measured quantities of material to a laundry wheel including measuring tank connected to supply sources, a vacuum for drawing material from the supply sources into the tank and a source of pressure for forcing the material out of the tank into the laundry wheel. Sequential operation of the system is controlled by an electrical circuit which responds to measuring electrodes within the measuring tank and includes a timer.

---

This application is a continuation-in-part of our copending application Ser. No. 317,889, filed Oct. 22, 1963, and now abandoned.

This invention relates to an automatic laundry system. More particularly, this invention relates to an automatic laundry system which is capable of delivering a measured quantity of liquid chemicals directly to the laundry wheels.

The system of the present invention includes a measuring and dispensing tank in which a pre-selected quantity of liquid can be accumulated and then dispensed therefrom to the laundry wheels. The liquid to be dispensed is introduced into the measuring tank while the measuring tank is subjected to a vacuum. The dispensing of the measured quantity of liquid chemicals can be accomplished by introducing pressurized air into the dispensing tank or by using any suitable pump. However, by utilizing a vacuum and pressure means in place of chemical pumps, it is possible to eliminate the need for expensive chemical pumps which would have to be designed to withstand corrosive action of the chemicals utilized in the laundry process.

The system of the present invention is such that a gravity flow system can be substituted for the vacuum means in installations where the chemical supply tanks can be mounted on an elevated platform above the level of the measuring tank and valve assembly. Thus, the liquid chemicals to be measured can be introduced into the measuring tank by means of gravity flow instead of by the application of vacuum to the tank. In this system, a pressure release valve would be substituted for the vacuum valve in order to release the air from the measuring tank as the chemical is introduced into the tank.

The system of the present invention includes electrical circuitry permitting the selection of the desired volume of liquid chemical to be measured in a measuring tank. The circuitry includes means to alternatively subject the measuring tank to vacuum or pressure and means to wash the interior of the measuring tank after each batch of chemicals is measured and dispensed therefrom.

The present invention also includes electrical circuitry for rendering the measuring and dispensing of chemicals completely automatic.

It is an object of the present invention to provide an automatic laundry.

It is another object of the present invention to provide an automatic system for delivering measured quantities of chemicals to a laundry wheel.

It is yet another object of the present invention to provide an automatic dispensing system for dispensing measured quantities of different chemicals.

It is still another object of the present invention to provide electronically controlled laundry process to automate the dispensing of chemicals to laundry wheels.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a schematic illustration of a laundry wheel and the associated chemical measuring and dispensing equipment.

FIGURE 2 is a schematic illustration of the electronic circuitry associated with the apparatus shown in FIGURE 1.

Referring now to the drawings in detail, wherein like numerals indicate like elements, there is shown in FIGURE 1 an automatic laundry system designated generally by the numeral 10.

The laundry system 10 includes a laundry wheel 12. In an actual system, several such laundry wheels would be utilized. However, the present invention may be adequately described in connection with a single wheel, and those skilled in the art will readily perceive its application to a plurality of wheels.

The system 10 includes a measuring tank 14 which will be described in greater detail hereinafter. The chemicals to be measured in the tank 14 and dispensed to the wheel 12 are disposed within the supply tanks 16, 18, 20 and 22. A greater or lesser number of supply tanks may be utilized in accordance with the principles of the present invention. Each of the tanks 16–22 may contain one of the following: soap, bleach, alkali, sour, starch, bluing, fabric softener, germicide, or any one of a number of other chemicals used in the laundering process. The tanks 16–22 are provided with outlet valves 24, 26, 28 and 30 respectively. Valves 24–30 may be electrically operated solenoid valves or they may be manually controlled valves. Check valves 32, 34, 36 and 38 are provided in the outlet conduits of the tanks 16–22 respectively downstream from the valves 24–30 respectively. In the alternative, the check valves 32–38 may be eliminated and an automatic return mechanism added to valves 24–30 to close these valves after a chemical has been drawn into tank 14. The liquid may be dispensed from tanks 16–22 by gravity or suitable pumps may be provided.

The outlet side of each of the check valves 32–38 is in communication with a conduit 40. The check valves permit liquid chemicals to flow in one direction only; that is they permit the chemical to flow from the tanks 16–22 into the conduit 40. As shown, conduit 40 branches into conduits 42 and 44. A valve 46 is connected across branch conduit 42 and controls the flow of fluid therethrough. Branch conduit 42 extends through a lid 50 on the tank 14 and terminates in a spray nozzle 48. The spray nozzle 48 is mounted so as to be above the lowermost end of each of the electrodes 72–82 extending downwardly from the lid 50. The check valve 62 is mounted in branch conduit 44. The branch conduit 44 is in communication with the interior of measuring tank 14 through a drain opening 64 in the bottom thereof.

The conduit 40 is connected to a source of water (not shown) through the valve 54. The outlet 64 is placed in communication with the conduit 52 by a check valve 66. The opposite end of conduit 52 is connected to conduit 68 which includes a valve 70 for controlling the flow of fluid to the laundry wheel 12. Valve 60 directs fluid from conduit 52 to additional laundry wheels (not shown).

The lid 50 is secured to the top of tank 14 by an airtight seal of any well known construction. A plurality of electrically conductive electrodes 72, 74, 76, 78, 80 and 82 depend from the lid 50 and extends into the tank 14 by progressively shorter lengths. Each of the electrodes 72–82 is electrically wired to one of the contacts 88, 90, 92, 94, 96 or 98 of the selector switch 84. Electrodes 72–82 are removably mounted to lid 50 so that they can be replaced. Selector switch 84 includes a movable contact arm 86 for selectively connecting the electrodes 72–82 into the electrical circuit to be described below.

Apparatus 100 is provided to selectively subject the interior of measuring tank 14 to a vacuum or a pressure. The apparatus 100 includes a vacuum pump 106 coupled to a vacuum tank 112 by means of the conduit 120. Apparatus 100 also includes a pressure pump 108 coupled to a pressure tank 114 by means of the conduit 122.

Vacuum tank 112 is coupled to the interior of measuring tank 14 by means of the conduits 109 and 104. Similarly, pressure tank 114 is in communication with the measuring tank 14 by means of the conduits 110 and 104. The valve 103 controls the flow of gases through conduit 109 and valve 105 controls the flow of gases through conduit 110. Pressure gauges 116 and 118 are provided for measuring the gas pressure within tanks 112 and 114 respectively.

The operation of the automatic laundry system 10 can be more fully appreciated in connection with the following description of its electrical circuitry. It will be assumed that an operator desires to dispense a volume of chemical liquid corresponding to the level of electrode 82. The chemical dispensed may be drawn from any one of the storage tanks 16–22 or it may be drawn from several of them so as to comprise a mixture of chemicals. The amount of chemicals to be dispensed is selected by rotating the contact on 86 to the position shown in FIGURE 1 of the drawing. Thus, the electrode 82 is electrically connected to the circuit to be described below. As will be made apparent, different volumes of chemical may be selected by rotating the contact arm 86 to make electrical connection with one of the other electrodes 72–82.

To begin operation, solenoid valves 54 and 46 are closed, valve 70 and one or several of the valves 24–30 are opened. The particular proportion of chemical to be supplied into the measuring tank 14 is determined by the degree to which the selected ones of the valves 24–30 are opened.

The measuring tank 14 is provided with a non-conductive lining 51 for preventing corrosion of the interior of the tank. The lining may be made of any well known plastic material which will resist the corrosive action of the chemicals used. The common ground electrode 83 depends from the lid 50 and extends the entire length of tank 14 so that it projects part way into the outlet 64. Common electrode 83 is connected directly to the electrical circuitry of the present invention. A bottom electrode 85 also depends from the lid 50 and extends to a point touching the bottom of tank 14. As will be explained below, electrode 85 acts as a sensor to determine when all of the chemical solution has been withdrawn from the tank.

Operation of the laundry system 10 is begun when an operator presses the start button 140 thereby connecting relay K1 to a source of electrical energy $E_2$. Energization of K1 closes contact K1–$d$ to contact K1–$c$ and closes contact K1–$g$ with contact K1–$f$. The closing of contact K1–$d$ to contact K1–$c$ locks up relay K1 through contact K2–$d$ and contact K2–$e$ of relay K2. The closing of contact K1–$g$ with contact K1–$f$ energizes solenoid valve 103 thereby placing the vacuum tank 112 in open communication with the measuring tank 14. Vacuum pump 106 will have been previously energized. Hence, the interior of measuring tank 14 will be evacuated and this in turn will draw the selected chemical from the particular tank or tanks 16–22 into the measuring tank 14.

When the chemical rises in tank 14 to a level where it contacts the selected electrode, in this example the lowermost end of electrode 82, a circuit is completed. The circuit comprises alternating current source $E_1$, relay K2, common electrode 83, the chemical solution, electrode 82, contact 98, contact arm 86, and relay contacts K2–$g$, $h$. The completion of this circuit energizes relay K2 which locks up in an energized condition through the circuit previously described except that bottom electrode 85 and relay contact K2–$f$, $g$ are in the circuit. Energization of relay K2 causes contact K2–$d$ to break connection with contact K2–$e$ thereby breaking the circuit to relay K1. The de-energization of relay K1 causes the solenoid valve 103 to close.

Energization of relay K2 closes contacts K2–$i$, $j$ thereby energizing relay K3 from alternating current source $E_2$. Relay K3 locks up through its contacts K3–$f$, $g$ and timer contacts T3–$a$, $b$. The closing of contact K3–$c$, $d$ completes a circuit to solenoid valve 105 and opens the same. Pressure pump 108 will be in operation and therefore the opening of valve 105 permits pressurized gas, such as air, to be directed into the tank 14 above the surface of the chemical therein. The gas pressure forces the liquid out of the tank through drain opening 64. The chemical solution flows through check valve 66, conduit 52, conduit 68, valve 70, into the laundry wheel 12. Check valve 62 prevents the flow of chemical solution back into conduit 44. Check valves 62 and 66 permit fluid flow only in the direction indicated by the arrows.

When the chemical solution clears the bottom electrode 85 because the pressure has forced all of it out of the measuring tank 14, the circuit to relay K2 is broken and it de-energizes. The de-energizing of relay K2 permits a circuit to be completed from source $E_2$ through the relay contacts K2–$j$, $k$, relay contacts K3–$j$, $i$, timing contacts T1–$c$, $b$ and timing motor 130. Thus, the timing motor will begin to rotate the timing cams T1, T2, and T3. The timing motor 130 is kept operating by the mechanical action of timing cam T1 which closes contact T1–$b$ with contact T1–$a$ thereby completing a circuit from source $E_2$ through the timing motor 130. The timing motor 130 will continue to run through one full rotation of the timing cam T1. At the end of such rotation, the contacts T1–$a$, $b$, open and the motor 130 stops.

Timer 128 has two separate time periods of operations, the first time period being approximately one-half total time period. During the first half of the time period, timing cam T2 closes contact T2–$b$ with contact T2–$a$ thereby energizing solenoid valve 54 and solenoid valve 46. These valves open upon energization and permit a flush liquid such as water to flow through conduit 42 and spray nozzle 48 into the measuring tank 14. The flush liquid with flush the inside of tank 14 and the electrodes 72–82 thereby cleansing them of any residual chemicals. The circuit for energizing solenoid valves 54 and 46 comprises alternating current source $E_2$, timing contacts T2–$b$, $a$, the flush water valves, and a return line to source $E_2$. Since relay K3 maintains pressure solenoid valve 105 in a open condition, the tank 14 is continuously under pressure during the entire flushing operation. Therefore the flush liquid will be forced from the tank 14 and into the laundry wheel 12. When the timer completes one-half of the timing cycle, contact T2–$b$ breaks connection with contact T2–$a$ and the circuit to flush water solenoid valve 54 and 46 is broken. These valves therefore de-energize and close off the supply of flushing liquid. For the balance of the timing cycle, gas pressure is maintained in the tank 14 in order to clear it and conduits 52, 68 of all liquid prior to dispensing the next chemical.

At the end of the timing cycle, timing cam T3 causes contacts T3–$a$, $b$ to open momentarily. This interrupts the circuit to relay K3 and it de-energizes. At this point the entire circuit has been restored to its original condition and a new cycle will not start until the start button 140 is depressed.

The present invention completely eliminates the manual system presently used in chemical laundries wherein the various cleaning chemicals are introduced into the wash wheels manually. The apparatus disclosed herein is automatic, economical, and accurate since the amount of chemicals introduced may be controlled and such amount repeated for each cycle.

The present invention may be embodied in other specific forms without departing from the spirit or essential attributes thereof and, accordingly, reference should be made to the appended claims, rather than to the foregoing specification as indicating the scope of the invention.

We claim:

1. In a laundry system comprising a plurality of supply tanks, a measuring tank, valve conduit means providing communication between the supply tanks and the measuring tank, selectively operable means for causing liquid to flow from said supply tanks to said measuring tank, selectively operable means for discharging the liquid from said tank, selectively operable means for detecting the level of the liquid received by said measuring tank from said supply tank, means responsive to said level detecting means for rendering said first-mentioned selectively operable means inoperative and for initiating operation of said means for discharging the liquid from said measuring tank, and means for flushing said measuring tank in response to the discharge of a measured quantity of liquid, said flushing means being operable in response to said responsive means.

2. In a laundry system in accordance with claim 1 wherein said first-mentioned selectively operable means includes means for evacuating gas from said measuring tank.

3. In a measuring system in accordance with claim 1 wherein said means for discharging liquid from the measuring tank includes apparatus for introducing pressurized gas into the measuring tank above the surface level of the liquid received therein.

4. In a system in accordance with claim 1 wherein said second-mentioned selectively operable means includes a plurality of electrodes of varying length extending into said measuring tank.

5. An automatic laundry system comprising at least one laundry wheel, a plurality of supply tanks adapted to contain liquid which are to be selectively introduced into the laundry wheel, a measuring tank, valved conduit means providing communication between the supply tanks and the measuring tank, valve conduit means providing communication between the laundry wheel and the measuring tank, a selectively operable vacuum means for causing liquid to flow from said supply tanks to said measuring tank, a selectively operable electrical means for detecting the level of liquid received by said measuring tank from said supply tanks, means responsive to said level detecting means for rendering the vacuum means inoperative, selectively operable pressure means for positively displacing the liquid from the measuring tank through the second mentioned conduit means into the laundry wheel, second means responsive to said level detecting means for operating said pressure means after said vacuum means is rendered inoperative, and means for flushing said measuring tank, said flushings including means responsive to said level detecting means for operating said flushing means for a pre-determined amount of time.

6. Apparatus comprising a measuring tank, means for introducing liquid into said tank, means for electrically detecting level of liquid accumulated in said tank, means for evacuating said tank to facilitate the introducton of liquid thereinto, means for pressurizing said tank to discharge said liquid from said tank through an outlet means in response to the accumulation of a pre-determined level of liquid in said tank, means for introducing a flushing liquid in said tank, and control means sequentially operating said evacuating means and said pressurizing means and said flushing means in response to said detecting means.

7. Apparatus in accordance with claim 6 wherein said detecting means includes a plurality of electrodes within said tank, and said flushing means includes a nozzle for spraying a flush liquid onto said electrodes.

8. Apparatus in accordance with claim 6 wherein said means for evacuating said tanks includes a vacuum pump, and said means for pressurizing said tank includes a pressure pump, a vacuum tank coupled to the inlet side of the vacuum pump, a pressure tank coupled to the outlet side of said pressure pump, and a valved conduit selectively communicating said measuring tank with said vacuum tank and said pressure tank.

9. In a laundry system comprising a plurality of supply tanks, a measuring tank, valved conduit means providing communication between supply tanks and the measuring tank, selectively operable means for causing liquid to flow from one of said supply tanks to said measuring tank, selectively operable means for discharging the liquid from said measuring tank, selectively operable means for detecting the level of the liquid received by said measuring tank from said supply tank, means responsive to said level detecitng means rendering said first mentioned selectively operable means inoperative and for operating said means for discharging the liquid from said measuring tank, said selectively operable level detecting means including a plurality of electrodes of varying length extending into said measuring tank, an empty tank sensing means, said empty tank sensing means comprising a pair of spaced electrical contacts adjacent the bottom of said tank, said spaced contacts being in electrically conducting relation with said selectively operable level detecting means, said spaced contacts being operative to provide a signal to said discharge operating means until all the liquid is discharged from said measuring tank.

10. A laundry system in accordance with claim 9 wherein said measuring tank has a plastic liner for preventing corrosion from liquid supplied from said supply tanks, said level detecting means including electrodes extending within said measuring tank, said electrodes being replacably mounted within said measuring tank, whereby said electrodes are the only elements in said tank which can be corroded by liquid in said measuring tank.

References Cited
UNITED STATES PATENTS

| | | | |
|---|---|---|---|
| 1,954,261 | 4/1934 | Pierce | 137—571 X |
| 2,083,965 | 6/1937 | Schulz | 222—76 X |
| 2,540,431 | 2/1951 | Davis et al. | 68—17 X |
| 2,641,992 | 6/1953 | Clemens | 137—392 X |
| 2,647,384 | 8/1953 | Erlanger | 68—17 |
| 3,091,252 | 5/1963 | Jones | 137—392 |
| 3,160,317 | 12/1964 | Hambro | 68—17 X |

FOREIGN PATENTS

| | | |
|---|---|---|
| 626,070 | 8/1961 | Canada. |

WILLIAM I. PRICE, *Primary Examiner.*